United States Patent
Kim

(10) Patent No.: US 10,847,119 B2
(45) Date of Patent: Nov. 24, 2020

(54) DISPLAY DEVICE AND METHOD OF OPERATING THE SAME

(71) Applicant: LG Display Co., Ltd., Seoul (KR)

(72) Inventor: Pureum Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/560,111

(22) Filed: Sep. 4, 2019

(65) Prior Publication Data
US 2020/0135144 A1    Apr. 30, 2020

(30) Foreign Application Priority Data
Oct. 30, 2018 (KR) .......................... 10-2018-0130440

(51) Int. Cl.
| | |
|---|---|
| *G09G 5/10* | (2006.01) |
| *G09G 3/3208* | (2016.01) |
| *G02B 27/01* | (2006.01) |
| *F21V 8/00* | (2006.01) |

(52) U.S. Cl.
CPC .............. *G09G 5/10* (2013.01); *G02B 6/0055* (2013.01); *G02B 27/0172* (2013.01); *G09G 3/3208* (2013.01); *G02B 2027/0118* (2013.01); *G09G 2360/141* (2013.01); *G09G 2360/144* (2013.01)

(58) Field of Classification Search
CPC .. G09G 5/10; G09G 3/3208; G09G 2360/144; G09G 2360/141; G09G 2360/14–144; G02B 6/0055; G02B 27/0172; G02B 2027/0118; G06F 3/011–013
See application file for complete search history.

(56) References Cited

U.S. PATENT DOCUMENTS

| | | | | |
|---|---|---|---|---|
| 8,970,571 B1* | 3/2015 | Wong | ................. | G02B 27/0101 345/207 |
| 9,223,152 B1* | 12/2015 | Kress | ................. | G02B 27/0172 |
| 2005/0200291 A1* | 9/2005 | Naugler, Jr. | .......... | H01L 27/323 315/149 |
| 2011/0221720 A1* | 9/2011 | Kuo | .................... | H01L 27/3269 345/206 |

(Continued)

FOREIGN PATENT DOCUMENTS

KR    10-2016-0014507 A    2/2016

*Primary Examiner* — Roberto W Flores
(74) *Attorney, Agent, or Firm* — Morgan, Lewis & Bockius LLP

(57) ABSTRACT

A display device includes: a display panel for outputting image light, a light guide portion for guiding the image light by reflecting the image light at least one time, a semi-transmissive portion for: reflecting the image light, guided by the light guide portion, toward the outside of the light guide portion, and at the same time: transmitting a first portion of external light entering the light guide portion, and reflecting a second portion of the external light, and a reflective portion for reflecting the second portion of the external light, reflected by the semi-transmissive portion, toward the display panel, wherein the display panel includes a light sensor for sensing the second portion of the external light reflected by the reflective portion, and wherein luminance of the image light of the display panel is changed in accordance with the amount of the external light sensed by the light sensor.

19 Claims, 5 Drawing Sheets

(56) References Cited

U.S. PATENT DOCUMENTS

| | | | |
|---|---|---|---|
| 2013/0113973 A1* | 5/2013 | Miao | G09G 3/003 |
| | | | 348/333.01 |
| 2014/0098311 A1* | 4/2014 | Lim | G09G 3/3648 |
| | | | 349/41 |
| 2014/0320971 A1* | 10/2014 | Gupta | G02B 5/22 |
| | | | 359/630 |
| 2015/0260992 A1* | 9/2015 | Luttmann | G02B 27/0172 |
| | | | 359/631 |
| 2017/0116950 A1* | 4/2017 | Onal | G02B 27/017 |
| 2017/0293144 A1* | 10/2017 | Cakmakci | G02B 27/0172 |
| 2018/0088339 A1* | 3/2018 | Aruga | G01S 19/48 |

* cited by examiner

DISPLAY DEVICE AND METHOD OF OPERATING THE SAME

CROSS-REFERENCE TO RELATED APPLICATION(S)

This application claims the benefit of and priority to Korean Patent Applications No. 10-2018-0130440, filed on Oct. 30, 2018, the entirety of which is hereby incorporated by reference.

BACKGROUND

1. Technical Field

The present disclosure relates to a display device and a method of operating the same, and more particularly, to a display device configured to display an image and a method of operating the same.

2. Discussion of the Related Art

A display device has a structure in which a light-emitting layer is formed between an anode electrode and a cathode electrode, and is a device for displaying an image by allowing the light-emitting layer to emit light through an electric field between the two electrodes. The light-emitting layer may include an organic material for emitting light by transiting exciton generated by combination of electrons and holes from an excited state to a ground state, or may include an inorganic material, such as quantum dot.

Recently, a head-mounted display (HMD) device has been developed for providing an augmented reality (AR), which displays one image by overlapping a virtual image with an image or background in reality through a display device. In the case of the head-mounted display device, if brightness of light (hereinafter, referred to as "external light" or "ambient light") irradiated from the outside is high, because the brightness of external light is higher than a luminance of an image output from the display device, visibility to a user for an image of the display device is deteriorated, and a problem occurs in that it is difficult for the user to clearly recognize the image.

SUMMARY

Accordingly, the present disclosure is directed to a display device and a method of operating the same that substantially obviate one or more of the issues due to limitations and disadvantages of the related art.

An aspect of the present disclosure is to provide a display device that can adjust luminance of an image output in accordance with brightness of external light.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display device, including: a display panel configured to output image light, a light guide portion configured to guide the image light of the display panel by reflecting the image light at least one time, a semi-transmissive portion configured to: reflect the image light, guided by the light guide portion, toward the outside of the light guide portion, and at the same time: transmit a first portion of external light entering the light guide portion, and reflect a second portion of the external light, and a reflective portion configured to reflect the second portion of the external light, reflected by the semi-transmissive portion, toward the display panel, wherein the display panel includes a light sensor configured to sense the second portion of the external light reflected by the reflective portion, and wherein luminance of the image light of the display panel is changed in accordance with the amount of the external light sensed by the light sensor.

In another aspect, there is provided a method of operating a display device, the method including: outputting, by a display panel, image light, guiding, by a light guide portion, the image light of the display panel by reflecting the image light at least one time, reflecting, by a semi-transmissive portion, the image light, guided by the light guide portion, toward the outside of the light guide portion, and simultaneously, by the semi-transmissive portion: transmitting a first portion of external light entering the light guide portion, and reflecting a second portion of the external light, reflecting, by a reflective portion, the second portion of the external light, reflected by the semi-transmissive portion, toward the display panel, sensing, by a light sensor in the display panel, the second portion of the external light reflected by the reflective portion, and changing luminance of the image light of the display panel in accordance with the amount of the external light sensed by the light sensor.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
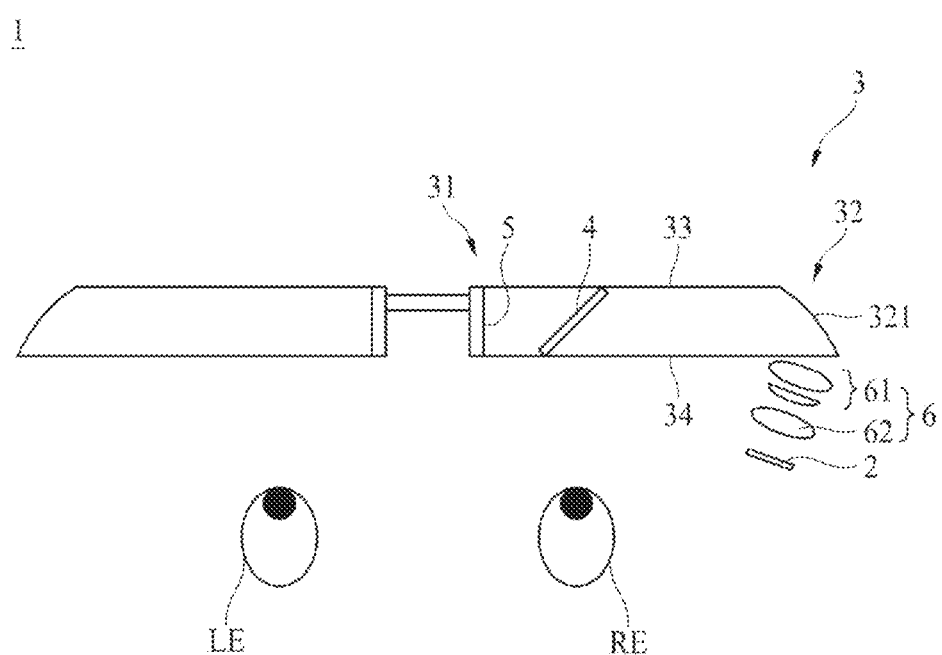
FIG. 1 is a plane view illustrating a display device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a display device and a method of operating the same according to an embodiment of the present disclosure will be described in detail with reference to the accompanying drawings.

Figure 2:
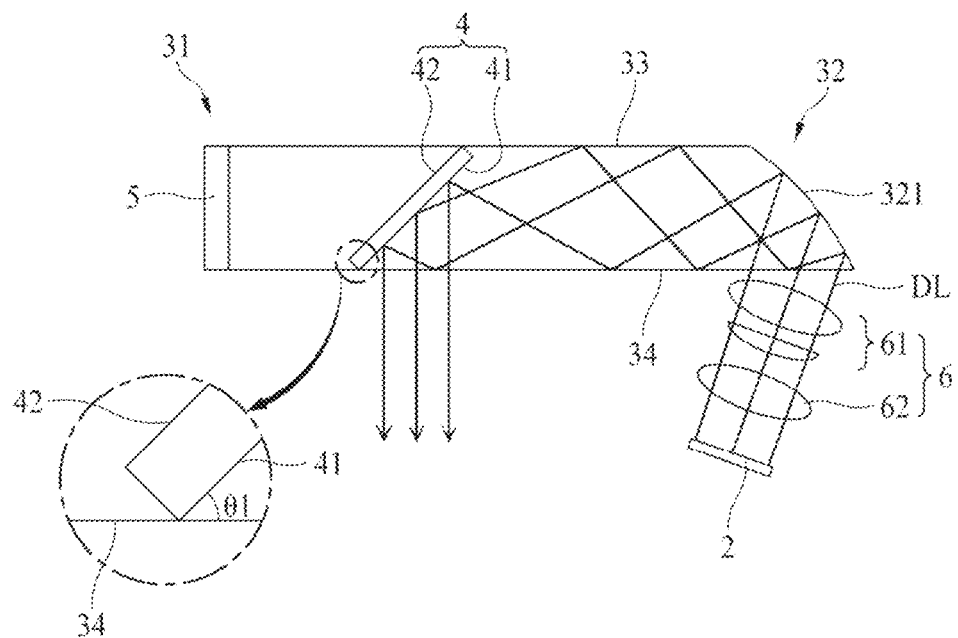
FIG. 2 is a plane view illustrating a light path of image light output by a display device according to an embodiment of the present disclosure.
Figure 3:
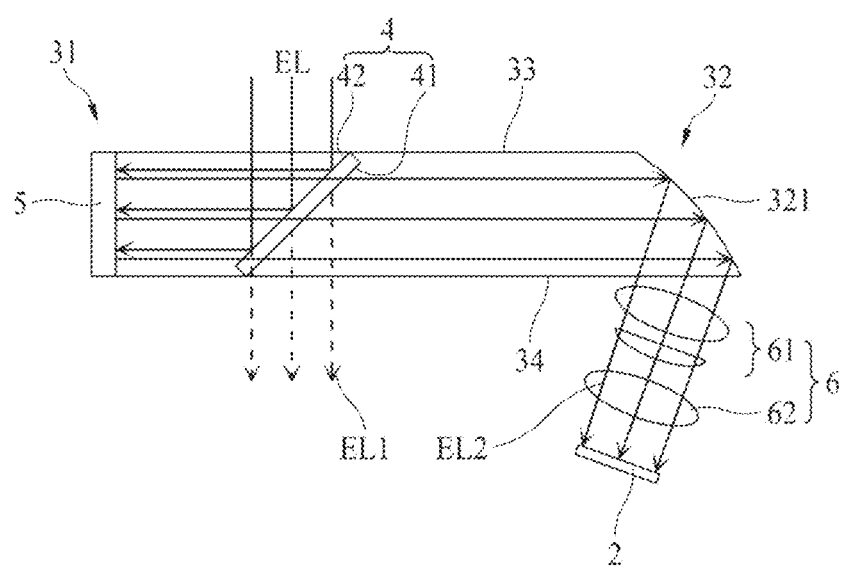
FIG. 3 is a plane view illustrating a light path of external light entering a display device according to an embodiment of the present disclosure.
Figure 4:
FIG. 4 is a cross-sectional view illustrating a display panel of a display device according to an embodiment of the present disclosure.

FIG. 1 is a plane view illustrating a display device according to an embodiment of the present disclosure. FIG. 2 is a plane view illustrating a light path of image light output by a display device according to an embodiment of the present disclosure. FIG. 3 is a plane view illustrating a light path of external light entering a display device according to an embodiment of the present disclosure. FIG. 4 is a cross-sectional view illustrating a display panel of a display device according to an embodiment of the present disclosure.

With reference to the examples of FIGS. 1 to 4, the display device 1 according to an embodiment of the present disclosure may include a display panel 2, a light guide portion 3, a semi-transmissive portion 4, and a reflective portion 5. The display panel 2 may include a light sensor 21 for sensing light of the outside (hereinafter, referred to as "external light" or "ambient light").

The display panel 2 may output image light DL. The image light DL may be a combination of light emitted from each of a plurality of subpixels of the display panel 2. For example, the image light DL may be a combination of red light, green light, and blue light. The image light DL may be a further combination of white light, in addition to the red light, the green light, and the blue light.

The display panel 2 may further may include a substrate 22, a first electrode 23, an organic light-emitting layer 24, and a second electrode 25, in addition to the light sensor 21. The substrate 22, the first electrode 23, the organic light-emitting layer 24, and the second electrode 25 may be configured to output the image light DL. The light sensor 21 may be used to absorb external light EL, but may be used to enhance or reduce luminance of the image light DL. The display panel 2 may be formed in a structure in which the light sensor 21, the substrate 22, the first electrode 23, the organic light-emitting layer 24, and the second electrode 25 may be deposited.

The display panel 2 may be coupled to the light guide portion 3. The display panel 2 may be connected to the light guide portion 3 in a head mount (not shown) constituting an external appearance of the display device 1 according to an embodiment of the present disclosure. For example, the light guide portion 3 may be arranged on a front surface of the head mount where a user's eyes may be located, and the display panel 2 may be arranged at one side of the light guide portion 3. Therefore, the image light DL output from the display panel 2 may enter the light guide portion 3. In addition, external light EL, entering the light guide portion EL, may enter the display panel 2. Although the display panel 2 may be fixedly coupled to the light guide portion 3, without limitation to this example, the display panel 2 may output the image light DL to the light guide portion 3, and may be rotatably coupled to the light guide portion 3 to receive external light EL from the light guide portion 3.

The external light EL entering the display panel 2 may be sensed by the light sensor 21. For example, the light sensor 21 may sense the external light EL by absorbing the external light EL entering the display panel 2. As the light sensor 21 senses the external light EL, luminance of the image light output from the display panel 2 may be changed. A detailed description of this will be given later.

The light guide portion 3 may guide the image light DL of the display panel 2 by reflecting the image light DL at least one time. The light guide portion 3 may be formed in a long transparent bar shape. The light guide portion 3 may guide the image light DL toward a user's eyes by totally reflecting the image light DL entering inside. Also, the light guide portion 3 may guide the external light EL entering inside toward the light sensor 21 by totally reflecting the external light EL. For example, the light guide portion 3 may be a prism. The light guide portion 3 may be formed in a curved shape to guide the image light DL and the external light EL by totally reflecting the image light DL and the external light EL.

The reflective portion 5 may be arranged at one side, e.g., a first side 31, of the light guide portion 3. The display panel 2 and a reflective surface 321 may be arranged at the other side of the light guide portion 3. For example, first side 31 of the light guide portion 3 may be a direction toward which a left eye LE of a user may be located. The other side, e.g., a second side 32, of the light guide portion 3 may be a direction toward which a right eye LE of a user may be located. Therefore, a virtual line for connecting the reflective portion 5 with the reflective surface 321 may be arranged in almost parallel with a virtual line for connecting the left eye LE of the user with the right eye RE of the user.

The reflective surface 321 may reflect the image light DL output from the display panel 2 toward the reflective portion 5 or toward the semi-transmissive portion 4. The reflective surface 321 may reflect a portion of the external light EL entering the light guide portion 3 toward the light sensor 21. The reflective surface 321 may be, but is not limited to, a mirror. The reflective surface 321 may include a reflective material that can reflect the image light DL and the external light EL. The reflective surface 321 may be provided as a plane or as a curved surface that can totally reflect the image light DL and the external light EL output from the display panel 2.

The image light DL of the display panel 2, reflected on the reflective surface 321, may be guided by the light guide portion 3, and may move toward the reflective portion 5 or toward the semi-transmissive portion 4. In addition, the external light EL, reflected on the reflective portion 5 and guided by the light guide portion 3, may be reflected on the reflective surface 321, and may move toward the light sensor 21 of the display panel 2.

The semi-transmissive portion 4, as shown in FIGS. 2 and 3, may reflect the image light DL guided by the light guide portion 3 toward the outside of the light guide portion 3, and at substantially the same time, may transmit a first portion EL1 of the external light EL entering the light guide portion 3, and may reflect a second portion EL2, other than the first portion EL1 of the external light EL. The semi-transmissive portion 4 may be between the reflective portion 5 and the reflective surface 321. The semi-transmissive portion 4 may be inclined with respect to the reflective portion 5. The semi-transmissive portion 4 may include a semi-transparent material that can transmit the first portion EL1 of the external light EL, and can reflect the second portion EL2. Therefore, the semi-transmissive portion 4 may reflect the image light DL guided from the second side 32 of the light guide portion 3 toward the outside of the light guide portion 3, may transmit the first portion EL1 of the external light EL entering the light guide portion 3, and may reflect the second portion EL2 of the external light EL.

For example, a user's eyes may be located at the outside of the light guide portion 3 where the semi-transmissive portion 4 may reflect the image light DL. Therefore, the user may acquire image information of the display panel 2 by recognizing the image light DL reflected on the semi-transmissive portion 4. At this time, the first portion EL1 of the external light EL, for a real image or background, may be transmitted through the semi-transmissive portion 4, and then may reach the user's eyes. Therefore, the user may experience augmented reality (AR) by recognizing the first portion EL1 of the external light EL, in addition to the image light DL of the display panel 2.

The external light EL may enter the light guide portion 3 through a front surface 33 of the light guide portion 3. The first portion EL1 of the external light EL entering the light guide portion 3 through the front surface 33 of the light guide portion 3 may be emitted to the outside of the light guide portion 3 through a rear surface 34 of the light guide portion 3 by transmitting the semi-transmissive portion 4. The front surface 33 of the light guide portion 3 may be a direction in which a real image or real background may be located, and the rear surface 34 of the light guide portion 3 may be a direction in which the user's eyes may be located. For example, the user's eyes may be located to be opposite to the real image or real background, based on the light guide portion 3. The rear surface 34 may be a direction in which the display panel 2 may be located.

The semi-transmissive portion 4 may be over the front surface 33 and the rear surface 34. For example, the semi-transmissive portion 4 may have a rectangular plate shape, such as a section of the light guide portion 3, and may be arranged obliquely with respect to the front surface 33 and the rear surface 34. Therefore, the semi-transmissive portion 4 may reflect the image light DL of the display panel 2, which may be guided by the light guide portion 3, toward the user's eyes.

The semi-transmissive portion 4 may reflect the second portion EL2 of the external light EL entering through the front surface 33 of the light guide portion 3 toward the reflective portion 5. The reflective portion 5 may reflect the second portion EL2 of the external light EL reflected by the semi-transmissive portion 4 toward the display panel 2. The external light EL may include visible rays, light of a long wavelength, such as infrared rays, and light of a short wavelength, such as ultraviolet (UV) rays. The reflective portion 5 may reflect all of the external light, including the visible rays, the light of a long wavelength, and the light of a short wavelength. The reflective portion 5 may be, but is not limited to, a mirror, and may include a reflective material that can reflect the second portion EL2 of the external light.

The second portion EL2 of the external light reflected by the reflective portion 5 may be reflected on the reflective surface 321, and may reach the display panel 2 after transmitting the semi-transmissive portion 4. The second portion EL2 of the external light, which may have reached the display panel 2, may be sensed by the light sensor 21. Therefore, in the display device 1 according to an embodiment of the present disclosure, when the light sensor 21 on the display panel 2 is used to adjust luminance of the image light DL, a light sensor for sensing brightness (e.g., illuminance) of external light may not be required separately, and the manufacturing cost may be reduced. Also, when a space for a separate light sensor is not required, the display device 1 may be embodied in a more compact size.

A light path of image light output from the display device 1 according to an embodiment of the present disclosure will be described with reference to FIG. 2. The image light DL output from the display panel 2 may be emitted through the reflective surface 321 arranged at the second side 32 of the light guide portion 3. A structure of the display panel 2 will be described with reference to FIG. 4. The display panel 4 may include a substrate 22, a first electrode 23, a light sensor 21, an organic light-emitting layer 24, and a second electrode 25.

The substrate 22 may be a plastic film, a glass substrate, or a semiconductor substrate, such as silicon. The substrate 22 may further may include a circuit element layer (not shown) provided on one surface. The circuit element layer may include a plurality of transistors TFT, gate lines, data lines, and a plurality of subpixels. Each of the plurality of subpixels may be provided in an area defined by a crossing structure of the gate lines and the data lines. The subpixels may respectively emit red light, green light, and blue light. The substrate 22 may further may include a subpixel for emitting white light. Each of the transistors may be arranged for each of the subpixels in the circuit element layer to apply a driving voltage for emitting light of a color corresponding to each subpixel.

The first electrode 23 may be on the substrate 22. The first electrode 23, according to one example, may include a metal material of high reflectivity, such as a deposited structure of aluminum and titanium (e.g., Ti/Al/Ti), a deposited structure of aluminum and indium tin oxide (ITO) (e.g., ITO/Al/ITO), an APC alloy, and a deposited structure of APC alloy and ITO (e.g., ITO/APC/ITO). The APC alloy may be an alloy of silver (Ag), palladium (Pb), and copper (Cu). The first electrode 23 may be an anode. The first electrode 23 may include a plurality of electrodes, which may be respectively arranged in the plurality of subpixels. The first electrode 23 for each respective subpixel may be connected to a corresponding transistor TFT provided for each of the subpixels to receive a driving voltage applied from the transistor TFT. Although not shown, a bank for partitioning the plurality of subpixels may cover an edge of each of the first electrodes 23 respectively provided for each of the subpixels.

The light sensor 21 may be between the first electrode 23 and the organic light-emitting layer 24. The light sensor 21 may sense external light EL entering through any one of the substrate 22 and the second electrode 25. For example, the light sensor 21 may sense the external light by absorbing the second portion EL2 of the external light entering through the reflective portion 5 and the reflective surface 321.

Although the light sensor 21 may include a material that can absorb all of light of a long wavelength, light of a short wavelength, and visible rays, the light sensor 21 may be provided as a material that can greatly absorb light of a long wavelength. This may be because that the image light DL output from the display panel 2 may be included in the visible rays. If the image light DL is included in the visible rays, when the light sensor 21 senses the image light DL, as well as the external light EL, interference may occur in the external light EL, and luminance of the image light DL may not be adjusted in accordance with exact brightness of the external light EL. Therefore, when the display device 1, according to an embodiment of the present disclosure, includes the light sensor 21 including a material that can absorb light of a long wavelength better than light of the other wavelengths, luminance of the image light DL output from the display panel 2 may be adjusted in accordance with the particular brightness of the external light EL. For example, the light sensor 21 may be provided as formamidinium lead iodide [$HC(NH_2)_2$]$PbI_3$($FAPbI_3$), which is a material of which a physical property may be changed by absorbing light, or may be provided as a material including $FAPbI_3$. However, without limitation to this example, the light sensor 21 may be provided as another material having the same or a similar electric generation as that of $FAPbI_3$, even though it may not include $FAPbI_3$.

The light sensor 21 may serve as a barrier function that may allow holes 'h' and electrons 'e' to not move well between the first electrode 23 and the organic light-emitting layer 24, in accordance with brightness of the external light EL, for example, the amount of the external light EL, or may serve as a passage that may allow the holes 'h' and the electrons 'e' to move well. The light sensor 21 may serve as a barrier function by absorbing less of the external light if brightness of the external light EL is low, and may serve as a moving passage by greatly absorbing the external light EL if brightness of the external light EL is high.

The organic light-emitting layer 24 may be arranged on the light sensor 21. The organic light-emitting layer 24, according to one example, may be a common layer commonly formed on the plurality of subpixels, and may be a white light-emitting layer for emitting white light. For example, the organic light-emitting layer 24 may be formed with a tandem structure including more than two stacks. Each of the stacks may include a hole transporting layer 241 (shown in FIG. 7A), at least one light-emitting layer 242 (shown in FIG. 7A), and an electron transporting layer 243 (shown in FIG. 7A).

Also, a charge-generating layer (not shown) may be formed between the stacks. The charge-generating layer may include an n-type charge-generating layer adjacent to the lower stack, and a p-type charge-generating layer on the n-type charge-generating layer and adjacent to the upper stack. The n-type charge-generating layer may inject electrons into the lower stack, and the p-type charge-generating layer may inject holes into the upper stack. The n-type charge-generating layer may include an organic layer doped with alkali metal, such as lithium (Li), sodium (Na), potassium (K), or cesium (Cs); or an alkali earth metal, such as magnesium (Mg), strontium (Sr), barium (Ba), or radium (Ra). The p-type charge-generating layer may be made by doping a dopant on an organic material that may be capable of transporting holes.

The second electrode 25 may be on the organic light-emitting layer 24. The second electrode 25, according to one example, may be a common layer commonly formed on the plurality of subpixels. The second electrode 25 may include a transparent conductive material (TCO), such as ITO and IZO, that may be capable of transmitting light, an ionic bond material, such as lithium fluoride (LiF), a metal material, such as Al, or a semi-transmissive conductive material such as Mg, Ag, or an alloy of Mg and Ag.

An encapsulation layer (not shown) may be formed on the second electrode 25. The encapsulation layer may reduce or prevent oxygen or water from being permeated into the organic light-emitting layer 24 and the second electrode 25. For example, the encapsulation layer may include at least one inorganic film and at least one organic film. The display panel 2 may output the image light DL through the above structure.

With further reference to FIG. 2, an optical lens portion 6 may be further provided between the reflective surface 321 and the display panel 2. The optical lens portion 6 may change a path of the image light DL of the display panel 2. In addition, the optical lens portion 6 may change a path of the second portion EL2 of the external light moving from the light guide portion 3 to the display panel 2. The optical lens portion 6 may include at least one of one or more projection lenses 61 that can diffuse or condense light by using a refractive index of a convex lens, a concave lens, etc., and one or more collimation lenses 62 that can emit incident light in parallel. Therefore, the image light DL output from the display panel 2 may be diffused or condensed through the optical lens portion 6, and then may reach the reflective surface 321.

The image light DL, which may have reached the reflective surface 321, may be reflected by the reflective surface 321. The image light DL, which may be reflected, may be guided by the light guide portion 3, and then may reach the semi-transmissive portion 4. The image light DL, which may have reached the semi-transmissive portion 4, may be reflected by the semi-transmissive portion 4, and then may be emitted to the outside of the light guide portion 3 where the user's eyes may be located.

For example, the semi-transmissive portion 4 may include a first surface 41 arranged to face the rear surface 34 of the light guide portion 3, and a second surface 42 arranged to face the front surface 33. The first surface 41 may reflect the image light DL guided by the light guide portion 3 toward the rear surface 34, and the second surface 42 may transmit the first portion EL1 of the external light entering through the front surface 33 toward the rear surface 34, and, at substantially the same time, may reflect the second portion EL2 of the external light EL toward the reflective portion 5.

As such, the image light DL, which may have reached from the reflective surface 321 to the semi-transmissive portion 4, may be reflected on the first surface 41, and then may be emitted toward the user's eyes. Therefore, the display device 1 according to an embodiment of the present disclosure may provide the user with the image light DL output from the display panel 2 through the first surface 41 of the semi-transmissive portion 4.

The semi-transmissive portion 4 may have a first angle $\theta 1$ with respect the rear surface 34. For example, the first angle $\theta 1$ may range from 30° to 60°. If the first angle $\theta 1$ is less than 30°, when the semi-transmissive portion 4 lies too far down toward the rear surface 34, the user may view the image light DL of the display panel 2, for example, a screen with a large size, and a problem may occur in that a size of the light guide portion 3 may be increased. If the first angle $\theta 1$ exceeds 60°, when the semi-transmissive portion 4 is erect to be close to be vertical to the rear surface 34, a problem may occur in that a screen may be viewed by the user in a small size. Therefore, in the display device 1 according to an embodiment of the present disclosure, when the first angle $\theta 1$ between the semi-transmissive portion 4 and the rear surface 34 is provided in the range from about 30° to 60°, the size of the light guide portion 3 may be reduced to embody the display device of a compact size and an image screen may be provided at an optimal size to allow the user to clearly recognize the image.

A light path of the external light entering the display device 1 according to an embodiment of the present disclosure will be described with reference to FIG. 3. The external light EL, including visible rays, light of a long wavelength, and light of a short wavelength, may enter the light guide portion 3 through the front surface 33 of the light guide portion 3. Although the external light EL may enter the light guide portion 3 over the entire front surface 33 of the light guide portion 3, only the external light EL entering the semi-transmissive portion 4 is shown in FIG. 3 for convenience of explanation.

The first portion EL1 of the external light EL entering the front surface 33 of the light guide portion 3 may be emitted to the rear surface 34 by transmitting the semi-transmissive portion 4 obliquely arranged at the first angle $\theta 1$, and may then reach the user's eyes. The second portion EL2 of the external light EL, other than the first portion EL1 of the external EL, may be reflected on the second surface 42 of the semi-transmissive portion 4, and its path may be changed to be toward the reflective portion 5.

The second portion EL2 of the external light EL, which may have reached the reflective portion 5, may reach the reflective surface 321 by transmitting the semi-transmissive portion 4 after being reflected on the reflective portion 5. After the second portion EL2 of the external light, which may have reached the reflective surface 321, is reflected on the reflective surface 321, and is emitted to the rear surface 34 of the light guide portion 3, its path may be changed through the optical lens portion 6, and may enter the display panel 2. Therefore, in the display device 1 according to an embodiment of the present disclosure, when the reflective portion 5 is added to a structure for providing a user with the image light DL, the external light EL may be easily provided to the display panel 2.

In FIGS. 2 and 3, the image light DL output from the display panel 2 and the external light EL sensed by the light sensor 21 may be classified for convenience to describe their light paths. For example, the image light DL and the external EL of the display panel 2 may be simultaneously guided by the display device 1 according to an embodiment of the present disclosure.

Figure 5A:
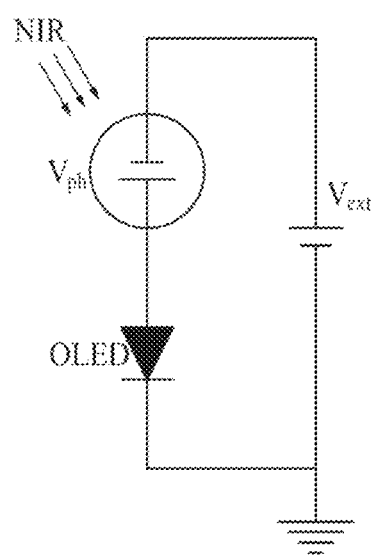
FIG. 5A is a circuit diagram illustrating an operation principle of a display device according to an embodiment of the present disclosure.
Figure 5B:
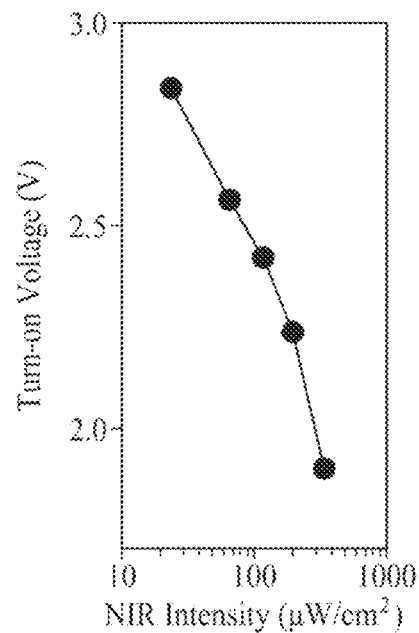
FIG. 5B is a graph illustrating a relation between brightness of external light and a turn-on voltage in a display device according to an embodiment of the present disclosure.
Figure 6:
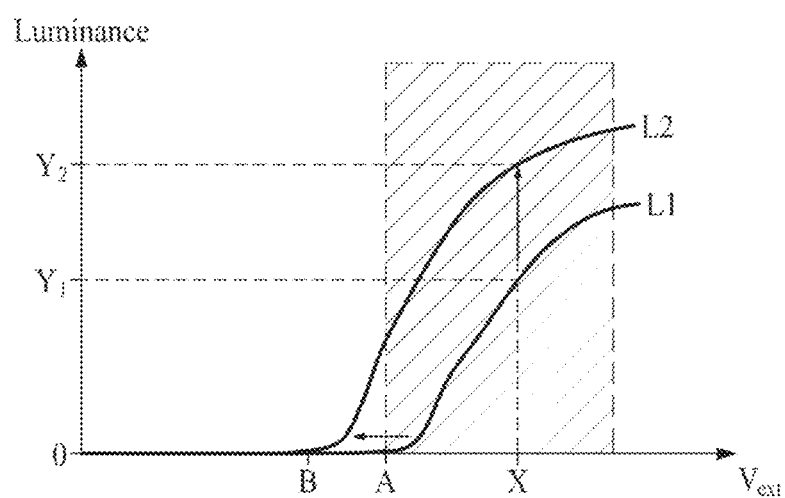
FIG. 6 is a graph illustrating that luminance of image light is increased when a driving voltage is uniformly maintained in a display device according to an embodiment of the present disclosure.

FIG. 5A is a circuit diagram illustrating an operation principle of a display device according to an embodiment of the present disclosure. FIG. 5B is a graph illustrating a relation between brightness of external light and a turn-on voltage in a display device according to an embodiment of the present disclosure. FIG. 6 is a graph illustrating that luminance of image light is increased when a driving voltage is uniformly maintained in a display device according to an embodiment of the present disclosure.

With reference to FIG. 5A, "NIR" indicates external light including light of an area close to light IR of a long wavelength, as well as the light IR of a long wavelength. "$V_{ph}$" is a voltage (hereinafter, referred to as a "photovoltage") of the light sensor 21. "OLED" is a voltage (hereinafter, referred to as an "organic light-emitting voltage") from which the organic light-emitting layer 24 may start to emit light. "$V_{ext}$" is a voltage applied between the first electrode 23 and the second electrode 25, e.g., a driving voltage. The driving voltage $V_{ext}$ may be a voltage obtained by adding the organic light-emitting voltage and the photovoltage $V_{ph}$. The organic light-emitting voltage has a certain voltage, although it may be varied depending on an element. Therefore, the driving voltage $V_{ext}$ may be varied based on the photovoltage $V_{ph}$. The photovoltage $V_{ph}$ may be varied depending on the amount of external light EL sensed by the light sensor 21, for example, the amount of external light EL that may be absorbed. For example, the external light EL may be the second portion EL2 of the external light. The voltage of the light sensor 21 may be lowered if the amount of the external light EL, which may be absorbed, is increased. When the amount of the external light EL is proportional to brightness of the external light EL, increase of the amount of the external light means that brightness becomes high. Therefore, when the amount of the external light, which may be absorbed, is increased, e.g., if brightness of the external light EL becomes high, the photovoltage $V_{ph}$ of the light sensor 21 may be lowered.

As a result, if the photovoltage $V_{ph}$ of the light sensor 21 is lowered, e.g., as brightness of the external light EL becomes high, a turn-on voltage for outputting the image light DL may be lowered. The turn-on voltage may mean the driving voltage $V_{ext}$.

With reference to FIG. 5B, a horizontal axis denotes an NIR intensity, and a vertical axis denotes a photovoltage. As shown in FIG. 5B, it may be noted that the photovoltage $V_{ph}$ may be gradually lowered if the intensity of NIR is increased. For example, the photovoltage $V_{ph}$ may be approximately 2.8 V when NIR intensity is 30 $\mu W/cm^2$, and the photovoltage $V_{ph}$ may be approximately 1.7 V when NIR intensity is 500 $\mu W/cm^2$. If the organic light-emitting voltage is uniformly maintained at 5 V, the driving voltage $V_{ext}$ may be lowered from 7.8 V to 6.7 V, approximately. This means that the driving voltage $V_{ext}$ may be lowered if the brightness of the external light EL is increased. For example, in the display device 1 according to an embodiment of the present disclosure, if brightness of the external light EL is increased, the image light DL may be output at a driving voltage lower than a driving voltage before brightness of the external light EL is increased. Therefore, if the driving voltage $V_{ext}$ applied to the display panel 2 is uniformly maintained, luminance of the image light DL may be enhanced as much as the lowered driving voltage.

With reference to FIG. 6, a horizontal axis denotes a driving voltage $V_{ext}$, and a vertical axis denotes luminance. L1 is a graph illustrating a relation between the driving voltage $V_{ext}$ and luminance in the case of low brightness, for example, if the amount of the external light EL is small, e.g., indoors. L2 is a graph illustrating a relation between the driving voltage $V_{ext}$ and luminance in the case of high brightness, for example, if the amount of the external light EL is great, e.g., outdoors. The hashed rectangular area denotes an area in which the display panel 2 outputs the image light DL at low brightness or more. The display device 1 according to an embodiment of the present disclosure may adjust luminance of the image light DL in accordance with brightness of the external light EL, without change of the driving voltage $V_{ext}$.

For example, with reference to FIGS. 5A to 6, an organic light-emitting voltage may be maintained at 5 V, regardless of whether indoors or outdoors, and a user may view an output image of the display panel 2 at a driving voltage $V_{ext}$ of 10 V and luminance of 1000 nit. For example, the photovoltage $V_{ph}$ applied to the light sensor 21 may become 5 V in accordance with an operation principle formula of FIG. 5A. If this is applied to the graph of FIG. 6, X may be 10 V and $Y_1$ may be 1000 nit. $Y_2$ may be luminance when the driving voltage $V_{ext}$ is 10 V indoors, and may be 2000 nit.

In L1, A may be a minimum driving voltage for allowing the display panel 2 to output the image light DL indoors, for example, a turn-on voltage for starting to output the image light DL indoors, and may be approximately 8 V. For example, when the organic light-emitting voltage is uniformly maintained at 5 V in accordance with the operation principle formula, the photovoltage $V_{ph}$ may be 3 V. L1 may be for indoors, but may be a nighttime condition. Brightness of L1 may be 0 lux to 2000 lux.

In L2, B may be a minimum driving voltage for allowing the display panel 2 to output the image light DL outdoors, for example, a turn-on voltage for starting to output the image light DL outdoors, and may be approximately 6 V. For example, when the organic light-emitting voltage is uniformly maintained at 5 V in accordance with the operation principle formula, the photovoltage $V_{ph}$ may be 1 V. L2 may be for outdoors, but may be a daytime condition. Brightness of L2 may be 5000 lux or more.

Consequently, when the photovoltage $V_{ph}$ is lowered outdoors, e.g., where brightness of the external light EL is higher than indoors, the whole driving voltage $V_{ext}$ may be more lowered. This may mean the turn-on voltage for starting to output the image light DL outdoor may be lower than the turn-on voltage of the indoor, and the time when the image light DL may be output outdoors may be brought forward from A to B.

Therefore, as shown in FIG. 6, if the driving voltage $V_{ext}$ X is uniformly maintained at 10 V, and in the case of movement from indoors to outdoors, when the amount of the external light EL sensed by the light sensor 21 is increased, the photovoltage $V_{ph}$ may be more lowered, the lowered photovoltage $V_{ph}$ may be compensated by luminance of the image light DL, and luminance of the image light DL may be more increased from 1000 nit to 2000 nit. Therefore, in the display device 1 according to an embodiment of the present disclosure, luminance of the image light DL may be automatically adjusted in accordance with brightness of the external light EL, without change of the driving voltage $V_{ext}$. For example, luminance of the image light DL of the display panel 2 may become high if the amount of the external light EL sensed by the light sensor 21 is increased, for example, if the photovoltage $V_{ph}$ is lowered.

Figure 7A:
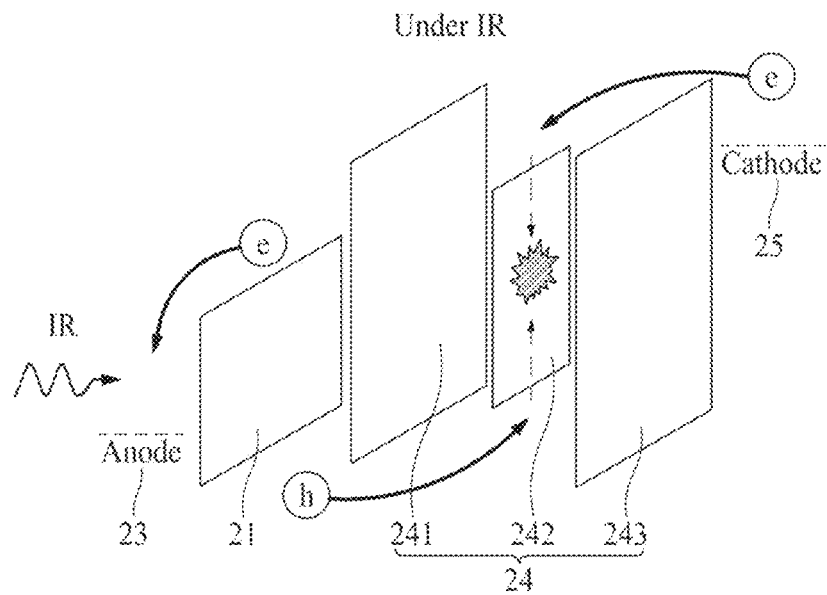
FIG. 7A is an exploded view illustrating a state of a light sensor when brightness of external light is high in a display device according to an embodiment of the present disclosure.
Figure 7B:
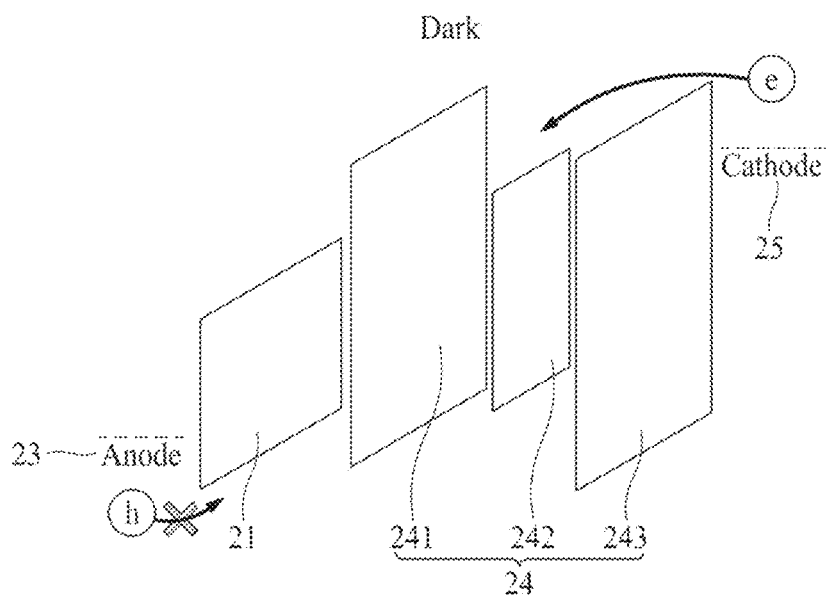
FIG. 7B is an exploded view illustrating a state of a light sensor when brightness of external light is low in a display device according to an embodiment of the present disclosure.

FIG. 7A is an exploded view illustrating a state of a light sensor when brightness of external light is high in a display device according to an embodiment of the present disclosure. FIG. 7B is an exploded view illustrating a state of a light sensor when brightness of external light is low in a display device according to an embodiment of the present disclosure.

With reference to FIG. 7A, when the amount of the external light EL sensed by the light sensor 21 is increased outdoors in high brightness, the light sensor 21 may serve as a moving passage through which holes 'h' and electrons 'e' may easily move. Therefore, the light-emitting layer 242 may emit light, and the voltage applied between the first electrode 23 and the second electrode 25, for example, the driving voltage $V_{ext}$, may be lowered. As described above, if the light sensor 21 is provided as $FAPbI_3$ or a material including $FAPbI_3$, the light sensor 21 may absorb light IR of a long wavelength better than the other light. Therefore, in the display device 1 according to an embodiment of the present disclosure, when the light sensor 21 may absorb and sense only light IR of a long wavelength, from which light of a visible ray area including the image light DL is excluded, luminance of the image light DL output from the display panel 2 may be adjusted more finely in accordance with brightness of the external light EL.

With reference to FIG. 7B, when the amount of the external light EL sensed by the light sensor 21 is reduced in the indoor of low brightness or at night time, the light sensor 21 may serve as a barrier to not move holes 'h' and electrons 'e'. Therefore, the driving voltage $V_{ext}$ applied between the first electrode 23 and the second electrode 25 should be higher than the case of high brightness, so that the light-emitting layer 242 may emit light. As such, in the display device 1 according to an embodiment of the present disclosure, if the driving voltage $V_{ext}$ for outputting the image light DL is uniformly applied, luminance of the image light DL may be automatically changed in accordance with the amount of the external light EL sensed by the light sensor 21.

For example, in the display device 1 according to an embodiment of the present disclosure, when the photovoltage $V_{ph}$ is lowered, for example, if brightness becomes high e.g., from a low brightness to a high brightness, luminance of the image light DL may be enhanced as much as the lowered photovoltage $V_{ph}$, and visibility of a user for the image light DL may be reduced or prevented from being deteriorated.

In addition, in the display device 1 according to an embodiment of the present disclosure, when the photovoltage $V_{ph}$ is enhanced, for example, if brightness becomes low, e.g., from a high brightness to a low brightness, it may be not required to lower the driving voltage $V_{ext}$ separately applied to the display panel 2, and luminance of the image light DL may be automatically lowered as much as the enhanced photovoltage $V_{ph}$.

Although not shown, the display panel 2, including the light sensor 21, the light guide portion 3, the semi-transmissive portion 4, the reflective portion 5, and the optical lens portion 6, may be arranged in a storage case. The storage case may be formed as, but is not limited to, a shape of a glasses frame. The storage case may be formed as a helmet shape to surround a top surface and both sides of a user's head. For example, the storage case may be a head mount.

The light guide portion 3, the semi-transmissive portion 4, and the reflective portion 5 may be arranged on a front surface of the storage case so that they may be located in front of a user's eyes, and the display panel 2 and the optical lens portion 6 may be arranged at a side of the storage case. However, without limitation to this example, the position may be changed so the user may easily identify the image light DL through the semi-transmissive portion 4, and the light sensor 21 may easily sense the external light EL. For example, the light guide portion 3, the semi-transmissive portion 4, and the reflective portion 5 may be arranged on the front surface of the storage case so that they may be located in front of a user's eyes, and the display panel 2 and the optical lens portion 6 may be arranged on a top surface or a lower surface of the storage case, which may be vertical to the front surface and the side of the storage case.

Also, in the display device 1 according to an embodiment of the present disclosure, although the display panel 2, including the light sensor 21, the light guide portion 3, the semi-transmissive portion 4, the reflective portion 5, and the optical lens portion 6, are shown as being arranged toward only a right eye RE in the examples of FIGS. 1 to 3, they may be arranged toward only a left eye LE, or may be arranged at both sides of the right eye RE and the left eye LE.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display device, comprising:
    a display panel including a plurality of subpixels configured to output image light;
    a light guide portion including a front surface and a rear surface configured to guide the image light of the display panel by reflecting the image light at least one time;
    a semi-transmissive portion configured to:
        reflect the image light, guided by the light guide portion, toward the outside of the light guide portion; and
        at the same time:
            transmit a first portion of external light entering the light guide portion; and
            reflect a second portion of the external light; and
    a reflective portion including a reflective material configured to reflect the second portion of the external light, reflected by the semi-transmissive portion, toward the display panel,
    wherein the display panel includes a light sensor configured to sense the second portion of the external light reflected by the reflective portion,
    wherein luminance of the image light of the display panel is changed in accordance with the amount of the external light sensed by the light sensor,
    wherein the semi-transmissive portion comprises:
        a first surface facing the rear surface; and
        a second surface facing the front surface,
    the first surface is configured to reflect the image light, guided by the light guide portion, toward the rear surface, and
    the second surface is configured to:
        transmit the first portion of the external light, entering through the front surface, toward the rear surface; and
        at the same time, reflect the second portion of the external light toward the reflective portion.

2. The display device of claim 1, wherein:
    the reflective portion is at a first side of the light guide portion; and
    a reflective surface, configured to reflect the second portion of the external light, reflected by the reflective portion, toward the light sensor, is at a second side of the light guide portion.

3. The display device of claim 2, wherein the semi-transmissive portion is between the reflective portion and the reflective surface.

4. The display device of claim 2, wherein the reflective surface comprises one of: a plane and a curved surface.

5. The display device of claim 1, wherein the semi-transmissive portion is arranged obliquely with respect to the reflective portion.

6. The display device of claim 1, further comprising an optical lens portion between the display panel and the light guide portion, the optical lens portion being configured to change respective paths of the image light and the external light.

7. The display device of claim 6, wherein the optical lens portion comprises at least one of: one or more projection lenses and one or more parallel lenses.

8. The display device of claim 1, wherein the display panel further comprises:
    a substrate comprising a plurality of subpixels thereon;
    a plurality of first electrodes on the substrate, each corresponding to one of the plurality of subpixels;
    an organic light-emitting layer on the plurality of first electrodes; and
    a second electrode on the organic light-emitting layer,
    wherein the light sensor is between plurality of first electrodes and the organic light-emitting layer.

9. The display device of claim 8, wherein the light sensor is configured to sense external light entering therein through one of: the substrate and the second electrode.

10. The display device of claim 1, wherein:
    the front surface receives the external light; and
    the rear surface receives the image light; and
    the semi-transmissive portion is over the front surface and the rear surface.

11. The display device of claim 10, wherein:
the semi-transmissive portion has a first angle with respect to the rear surface; and
the first angle is in a range from 30° to 60°.

12. The display device of claim 1, wherein the second surface is further configured to transmit the second portion of the external light, reflected by the reflective portion, toward the light sensor.

13. The display device of claim 1, wherein the light sensor has a voltage that is lowered when the amount of the external light sensed by the light sensor is increased.

14. The display device of claim 13, wherein a turn-on voltage for outputting the image light is lowered when the voltage of the light sensor is lowered.

15. The display device of claim 13, wherein the luminance of the image light of the display panel is enhanced when the voltage of the light sensor is lowered.

16. A method of operating a display device, the method comprising:
outputting, by a display panel, image light;
guiding, by a light guide portion, the image light of the display panel by reflecting the image light at least one time;
reflecting, by a semi-transmissive portion, the image light, guided by the light guide portion, toward the outside of the light guide portion; and
simultaneously, by the semi-transmissive portion:
transmitting a first portion of external light entering the light guide portion; and
reflecting a second portion of the external light;
reflecting, by a reflective portion, the second portion of the external light, reflected by the semi-transmissive portion, toward the display panel;
sensing, by a light sensor in the display panel, the second portion of the external light reflected by the reflective portion; and
changing luminance of the image light of the display panel in accordance with the amount of the external light sensed by the light sensor;
wherein the light guide portion comprises:
a front surface configured to receive the external light; and
a rear surface configured to receive the image light, and
wherein the semi-transmissive portion comprises:
a first surface facing the rear surface; and
a second surface facing the front surface,
the first surface is configured to reflect the image light, guided by the light guide portion, toward the rear surface, and
the second surface is configured to:
transmit the first portion of the external light, entering through the front surface, toward the rear surface; and
at the same time, reflect the second portion of the external light toward the reflective portion.

17. The method of claim 16, further comprising, when the amount of the external light sensed by the light sensor is increased, lowering a voltage of the light sensor.

18. The method of claim 17, further comprising, when the voltage of the light sensor is lowered, lowering a turn-on voltage for outputting the image light.

19. The method of claim 17, further comprising, when the voltage of the light sensor is lowered, the luminance of the image light of the display panel is enhanced.

* * * * *